United States Patent [19]

Buxbaum et al.

[11] 3,975,354

[45] Aug. 17, 1976

[54] GLASS FIBER-REINFORCED FLAME-RESISTANT THERMOPLASTIC POLYESTER MOULDING COMPOSITIONS CONTAINING POLY(2,4,6-TRIBROMOSTYRENE)

[75] Inventors: Lothar Buxbaum, Lindenfels; Franz Breitenfellner, Bensheim, both of Germany

[73] Assignee: Ciba-Geigy Corporation, Ardsley, N.Y.

[22] Filed: Dec. 12, 1974

[21] Appl. No.: 532,124

[30] Foreign Application Priority Data

Dec. 17, 1973 Switzerland.................... 17661/73

[52] U.S. Cl. .................. 260/40 R; 260/45.7 R;
   260/873; 260/DIG. 24
[51] Int. Cl.$^2$ ......................................... C08G 39/02
[58] Field of Search........... 260/873, 91.5, DIG. 24,
   260/40 R, 45.7 R

[56] References Cited
UNITED STATES PATENTS

| 3,624,024 | 11/1971 | Caldwell et al. .................. 260/40 R |
|---|---|---|
| 3,644,574 | 2/1972 | Jackson et al. .................... 260/873 |
| 3,671,487 | 6/1972 | Abolins ............................ 260/40 R |
| 3,780,141 | 12/1973 | Jin et al. .......................... 260/873 X |
| 3,816,562 | 6/1974 | Haloch et al................ 260/45.7 R X |
| 3,855,277 | 12/1974 | Fox............................. 260/DIG. 24 |

FOREIGN PATENTS OR APPLICATIONS 47-14500    5/1972    Japan

OTHER PUBLICATIONS

*Chemical Abstracts,* per. 66:19,352a (Aug., 1966).
*Chemical Abstracts,* per. 72:3,836z (1969).
*Chemical Abstracts,* per. 72:32,493r (Nov., 1969).

*Primary Examiner*—Lewis T. Jacobs
*Assistant Examiner*—S. M. Person
*Attorney, Agent, or Firm*—Luther A. R. Hall

[57] ABSTRACT

Glass fiber-reinforced thermoplastic polyester moulding compositions which contain poly(2,4,6-tribromostyrene) range from flame-resistant to flame-proof and exhibit improved toughness properties. These moulding compositions can be used for the manufacture of shaped articles of all kinds, in accordance with the known processes.

12 Claims, No Drawings

GLASS FIBER-REINFORCED FLAME-RESISTANT THERMOPLASTIC POLYESTER MOULDING COMPOSITIONS CONTAINING POLY(2,4,6-TRIBROMOSTYRENE)

The present invention relates to glass fibre-reinforced flame-resistant thermoplastic moulding compositions of saturated polyesters to which poly(2,4,6-tribromostyrene) has been admixed as the flame-resistant component, and which optionally contain reinforcing fillers and/or further customary additives.

The manufacture of mouldings for technical fields of use, from saturated polyesters, especially from poly(ethylene terephthalates) or poly(butylene terephthalates) which are optionally reinforced with glass fibres, has been known for a considerable time. However, these mouldings are very readily inflammable and combustible, which makes it impossible to use them in fields where self-extinguishing or non-inflammable mouldings are required, for example in the electrical industry.

In order to make mouldings of these polyesters available for technically advantageous and important applications it is customary to admix highly halogenated organic compounds, optionally together with, for example, antimony trioxide, to the moulding compositions in order to render them flameproof. Thus, published Japanese Patent Application 69/15,555 proposes to add tetrabromophthalic anhydride together with antimony trioxide to a glass fibre-reinforced poly(ethylene terephthalate), and DT-AS 2,042,450 describes the admixture of organohalogen compounds, for example decabromodiphenyl or decabromodiphenyl ether, together with antimony trioxide, to glass fibre-reinforced polypropylene or polybutylene terephthalates. The proposals have the disadvantage that the organohalogen compounds and antimony trioxide used as fillers have a pigmenting action and lower the mechanical properties of the polyesters, especially the toughness properties.

In order substantially to preserve these properties in polyesters which have been rendered flame-resistant, DT-OS 2,310,742 proposes to mix, for example, a poly(butylene terephthalate) with an aromatic carbonate copolymer and a synergistic compound, for example antimony trioxide, 25 to 75% by weight of the recurring units in the carbonate copolymer containing phenol units substituted by chlorine or bromine. In these cases, the toughness properties, as compared to pure polybutylene terephthalate, are admittedly retained, but this can only be achieved with a relatively high amount of added carbonate copolymer. It is a particular disadvantage that only with relatively high amounts of the added carbonate copolymer or additionally with synergistic compounds, for example antimony trioxide, are self-extinguishing formulations obtained.

It is the object of the present invention to provide an agent for rendering thermoplastic glass fibre-reinforced polyesters flame-resistant to flameproof, which, as compared to known agents, improves the toughness properties of a polyester when admixed thereto, or does not reduce the toughness properties as greatly as low molecular organic halogen compounds do, at the same time has only little effect on the other properties, permits the formulation of at least self-extinguishing mixtures if relatively small amounts are added, and gives non-inflammable formulations if synergistic substances, such as, for example, antimony trioxide, are used in addition or if major amounts of the agent are admixed to the polyester.

Accordingly, the present invention relates to glass fibre-reinforced flame-resistant thermoplastic polyester moulding compositions which contain a saturated polyester and, optionally, synergistic substances, and are characterised in that 3 to 30% by weight of poly(2,4,6-tribromostyrene), relative to the total composition, are admixed.

It has been found that poly(2,4,6-tribromostyrene) can be mixed with a polyester and the moulding composition thus produced can be used for the manufacture of mouldings without decomposition phenomena leading to discolouration or enbrittlement of the material at the requisite mixing and/or processing temperatures.

Preferably, the polyester moulding composition contains 6 to 20% by weight of poly(2,4,6-tribromostyrene) and preferably its degree of polymerisation is 100 to 6,000, especially 500 to 4,000. The upper limit of the degree of polymerisation depends on economic aspects of the processes of manufacture known for vinyl polymers and on the molecular weights achievable by these processes.

Suitable saturated polyesters in the moulding compositions according to the invention are the homopolyesters and copolyesters which are obtained in accordance with known processes from polyester-forming monomers, for example dicarboxylic acids, diols and hydroxycarboxylic acids. The viscosity of these polyesters depends on the end use and on economic aspects. In general, the saturated polyesters have a relative viscosity of 1.2 to 4.0, preferably 1.3 to 3.5.

The following may be mentioned as examples of dicarboxylic acids: aliphatic dicarboxylic acids, such as malonic acid, succinic acid, adipic acid and sebacic acid, of which the alkylene radical can also be substituted; cycloaliphatic and cycloaliphatic-aliphatic dicarboxylic acids, such as 1,3-cyclopentanedicarboxylic acid, 1,3- or 1,4-cyclohexanedicarboxylic acid and 1-carboxymethyl-4-cyclohexanecarboxylic acid; aromatic dicarboxylic acids, such as terephthalic acid or isophthalic acid, 2,5-dibromoterephthalic acid, 2,6-naphthalenedicarboxylic acid, 4,4'-diphenyldicarboxylic acid and 4,4'-sulphone-diphenyldicarboxylic acid. Further dicarboxylic acids containing two 4-membered to 6-membered carbocyclic rings are described, for example, in U.S. Pat. No. 3,547,888 and aromatic dicarboxylic acids containing imido groups, for example N-carboxyphenyl-pyromellitic acid imide, are described in U.S. Pat. No. 3,217,014. Dicarboxylic acids containing amido groups which can easily be manufactured, for example, by reacting aminocarboxylic acids or diamines with dicarboxylic acid monochlorides, should also be mentioned.

Hydroxycarboxylic acids which can be used are aliphatic, cycloaliphatic, cycloaliphatic-aliphatic, aromatic and aromatic-aliphatic acids. The following may be mentioned as examples: glycolic acid, β-hydroxypropionic acid, β- or γ-hydroxybutyric acid, p-hydroxycyclohexanecarboxylic acid, para-hydroxymethylcyclohexanecarboxylic acid, m- or p-hydroxybenzoic acid and p-hydroxyphenylacetic acid.

Suitable diols are the aliphatic glycols, especially those with 2 to 10 carbon atoms in the molecule, cycloaliphatic and cycloaliphatic-aliphatic diols, such as 1,4-dihydroxycyclohexane, 1,4-dihydroxymethylcyclohexane, aromatic and aromatic-aliphatic diols, such as hydroquinone, p-xylylene glycol or 2,5-dichloro-p-xylylene glycol and diols containing heterocyclic rings, for example 1,3-bis(hydroxyalkyl)-benzimidazolones or 1,1-methylene-bis-[3-(2′-hydroxyethyl)-5,5-dimethylhydantoin].

Economically the most important thermoplastic polyesters are those which consist of at least 40 mol % of terephthalic acid radicals and at least 40 mol % of aliphatic diol radicals with 2 to 10, especially 2 to 4, carbon atoms, or radicals of 1,4-dihydroxymethylcyclohexane. These polyesters, especially those built up from aliphatic diols with 2 to 4 carbon atoms and terephthalic acid, are employed preferentially. Pure polyalkylene terephthalates of which the alkylene radical contains 2 to 4 carbon atoms are particularly preferred. The saturated polyesters can also contain small amounts, preferably 0.1 to 2 mol %, of a co-condensed compound which possesses more than two polyester-forming groups, for example pentaerythritol.

Further, it is also possible to employ blends of homopolyesters, copolyesters or homopolyesters and copolyesters for the thermoplastic polyester moulding compositions according to the invention.

The known processes for the manufacture of the saturated polyesters are, for example, solution condensation or azeotropic condensation, phase boundary condensation, melt condensation or solid phase condensation, and combinations of these methods, depending on which polyester-forming derivatives and reaction catalysts are used.

A poly(2,4,6-tribromostyrene) and, optionally, synergistic substances are mixed with the glass fibre-reinforced polyesters in accordance with customary methods, in devices known for mixing inert additives with polymers, for example in a tumbler mixer. An alternative procedure is to add glass fibres and poly(2,4,6-tribromostyrene) simultaneously. The glass fibres can be coated with the customary adhesion promoters, referred to as sizes, or an adhesion promoter, for example epoxide-alkoxysilanes, can be added to the polymer to impart better properties to the glass fibre-reinforced polymer.

These additives or other inert additives of all kinds, such as, for example, further fillers, especially reinforcing fillers, inorganic or organic pigments, optical brighteners, delustering agents, crystallisation-promoting agents, lubricants or mould release agents, can be added already during the manufacture of the polyesters or during mixing with poly(2,4,6-tribromostyrene). The addition of 5 to 60% by weight, especially of 10 to 40% by weight, of glass fibres, based on the total composition, is particularly preferred, and isotropic properties can be imparted to the moulding compositions according to the invention by a further addition of glass spheres of size less than 500 μ.

Self-extinguishing to non-inflammable formulations can be achieved even by merely mixing poly(2,4,6-tribromostyrene) with saturated glass fibre-reinforced polyesters. However, it is also possible additionally to admix to this mixture a substance which in a known manner, because of synergistic effects, further increases the flame-resistant action of organic halogen compounds. Such substances are organic or inorganic compounds which contain an element of the fifth main group. It is generally known that antimony compounds, in particular, possess this effect and that the use of antimony trioxide is particularly preferred because of the ease of handling of the material. In general, the addition of these compounds is associated with a further deterioration in the toughness properties. However, the polyester moulding compositions according to the invention have such good toughness properties that by further addition of the synergistic substances non-inflammable formulations are obtained, without excessively impairing the above properties, if only minor amounts of the poly(2,4,6-tribromostyrene) are present. This also has the advantage that the overall pattern of properties of the saturated polyester is only changed little.

For the above purpose, preferably 0.5 to 10% by weight, based on the total composition, of a compound which contains an element of the fifth main group, especially 1 to 8% by weight of antimony trioxide, are admixed.

Non-inflammable to self-extinguishing mouldings with valuable properties can be produced from the polyester moulding compositions according to the invention by the customary moulding processes, such as casting, injection moulding and extrusion.

In particular, the new moulding compositions are suitable for use as "engineering plastic" materials which can be used for the manufacture of mouldings such as gear-wheels, containers for chemicals or foodstuffs, machine components and appliance components, sheets and also semi-finished goods which can be shaped by machining.

Austrian Pat. No. 295,860 describes thermoplastic polyester moulding compositions which are mixed with styrene-butadiene copolymers in order to improve the toughness properties. Page 2, lines 26 and 27, of this Patent Specification mentions that the addition of polystyrene leads to enbrittlement of the material. Particularly in the light of this disclosure it is especially surprising and unforeseeable that the notched impact strength of the moulding compositions according to the invention is increased compared to a pure polyester and that the impact strength is substantially high compared to a polyester moulding composition which has been mixed with an organic low molecular organo-halogen compound. Further, it is surprising that even with relatively small additions of a poly(2,4,6-tribromostyrene) self-extinguishing formulations are obtained and with higher additions non-inflammable formulations are obtained, which has the advantage that it is not necessary to co-use a synergistic compound which would further reduce the toughness properties.

The examples which follow explain the subject of the invention. The weights quoted are percentages by weight, based on the total moulding composition. The standard methods according to which the characteristic data are determined are indicated in the particular examples.

Manufacture of the starting products

EXAMPLE A

Manufacture of polybutylene terephthalate 3,000 g of dimethyl terephthalate, 2,800 g of 1,4-butanediol and 1.78 g of titanium tetraisopropylate are introduced into a 10 l reactor equipped with a stirrer, nitrogen inlet and separating column. 98.5% of the theoretical amount of methanol are distilled off over the course of 4.5 hours whilst stirring and passing nitrogen through the reactor; at the same time the temperature of the reaction mixture rises to 200°C.

The mixture is then transferred into a second reactor, a vacuum of 0.5 mm Hg is applied over the course of 1.5 hours and at the same time the reaction temperature is raised to 250°C. After a further 3 hours the reaction is terminated, the melt is extruded through dies to form ribbons and the ribbons are chilled in water at 18°C and comminuted to form colourless cylindrical granules of size 2 × 3 mm, the material having a relative viscosity of 2.13.

Manufacture of the moulding compositions

EXAMPLE 1

56% by weight of polybutylene terephthalate manufactured according to Example A, which has been dried for 10 hours at 100°C in vacuo, are mixed with 14% by weight of poly(2,4,6-tribromostyrene) and 30% by weight of glass fibres in a tumbler mixer and the mixer is then granulated by means of an extruder, at temperatures of 240°C. The granules are dried at 100°C for 10 hours and then injection-moulded by means of an injection moulding machine to form test specimens for the measurements. The temperature of the intake zone is 220°C, the barrel temperature is 240°C, the temperature of the output zone is 260°C and the mould temperature is 80°C. The cycle time for the production of the mouldings is 45 seconds. The characteristic data are listed in Table 1.

The poly(2,4,6-tribromostyrene) used has a density of 2.3 g/cm$^3$ and a bromine content of 69% (manufacturer: Chemische Fabrik Kalk GmbH, West Germany). The glass fibres used, described as grade CS 419/X1, are manufactured by Messrs. Owens Corning Fibreglass, Belgium.

EXAMPLE 2

Test specimens of the following composition are manufactured analogously to Example 1: 53.3% by weight of polybutylene terephthalate, 13.3% by weight of poly(2,4,6-tribromostyrene), 4.8% by weight of antimony trioxide and 28.6% by weight of glass fibres.

The characteristic data are listed in Table 1.

EXAMPLE 3

(Comparison example)

Test specimens consisting of 70% by weight of polybutylene terephthalate and 30% by weight of glass fibres are manufactured under the conditions of Example 1. The characteristic data are listed in Table 1.

EXAMPLE 4

(Comparison example)

A mixture of 59.5% by weight of polybutylene terephthalate, 7.0% by weight of decabromodiphenyl, 3.5% by weight of antimony trioxide and 30.0% by weight of glass fibres is converted to test specimens analogously to Example 1. The characteristic data are listed in Table 1.

Mechanical properties of glass fibre-reinforced PBT/poly(2,4,6-tribromostyrene)

| Example No. | Density (g/cm$^3$) | Tensile strength at 23°C (kg/cm$^2$), DIN 53,455 | Flexural strength at 23°C (kp/cm$^2$), ASTM D 790 | Flexural modulus at 23°C (kp/cm$^2$), DIN 53,457 | Impact strength at 23°C (cm.kp/cm$^2$) DIN 53,453 | Notched impact strength at 23°C (cm.kp/cm$^2$) DIN 53,453 | Heat distortion pont ISO/R 75 (°C), Method A | Inflammability ASTM D 635 cm/minute |
|---|---|---|---|---|---|---|---|---|
| 1 | — | 1,220 | 1,980 | 85,600* | 32.4 | 11.5 | — | self-extinguishing, specimen thickness: 4 mm |
| 2 | 1.6998 | 1,160 | 1,830 | 92,300* | — | — | — | non-inflammable specimen thickness: 4 mm |
| 3 | 1.53 | 1,330 | 2,020 | 85,000 | 40 | 8 | 205 | combustibility: 1.2 cm/min specimen thickness: 4 mm |
| 4 | 1.66 | 1,200 | 2,000 | 90,000 | 24 | 6 | 205 | non-inflammable specimen thickness: ½ inch |

*Flexural modulus according to ASTM D 790

What we claim is:

1. A flame-resistant thermoplastic glass fibre-reinforced polyester moulding composition which contains a saturated polyester and, optionally, synergistic substances, characterised in that 3 to 30% by weight of poly(2,4,6-tribromostyrene), relative to the total composition, are admixed.

2. A polyester moulding composition according to claim 1, characterised in that 6 to 20% by weight of poly(2,4,6-tribromostyrene) are admixed.

3. A polyester moulding composition according to claim 1, characterised in that the saturated polyester contains, as condensed units, at least 40 mol % of terephthalic acid radicals and at least 40 mol % of radicals of alkylenediols with 2 to 10 carbon atoms or the 1,4-dihydroxymethylcyclohexane radical.

4. A polyester moulding composition according to claim 3, characterised in that the radicals of the alkylenediols contain 2 to 4 carbon atoms.

5. A polyester moulding composition according to claim 4, characterised in that the saturated polyester is a polyalkylene terephthalate of which the alkylene radical contains 2 to 4 carbon atoms.

6. A polyester moulding composition according to claim 5, characterised in that the saturated polyester is a polybutylene terephthalate.

7. A polyester moulding composition according to claim 3, characterised in that the saturated polyester contains, as condensed units, 0.1 to 2 mol % of a compound which possesses more than two polyester-forming groups.

8. A polyester moulding composition according to claim 1, characterised in that it contains 5 to 60% by weight of glass fibres, based on the total composition.

9. A polyester moulding composition according to claim 8, characterised in that it contains 10 to 40% by weight of glass fibres.

10. A polyester moulding composition according to claim 1, characterised in that it additionally contains, as a synergistic substance, 0.5 to 10% by weight, based on the total composition, of a compound which contains an element of the fifth main group.

11. A polyester moulding composition according to claim 10, characterised in that it contains 1 to 8% by weight of antimony trioxide.

12. A moulding composition according to claim 1, characterised in that the poly(2,4,6-tribromostyrene) has a degree of polymerisation of 100 to 6,000, especially 500 to 4,000.

* * * * *

REEXAMINATION CERTIFICATE (870th)
United States Patent [19]
Buxbaum et al.

[11] B1 3,975,354

[45] Certificate Issued   Jun. 21, 1988

[54] GLASS FIBER-REINFORCED FLAME-RESISTANT THERMOPLASTIC POLYESTER MOULDING COMPOSITIONS CONTAINING POLY(2,4,6-TRIBROMOSTYRENE)

[75] Inventors: Lothar Buxbaum, Lindenfels; Franz Breitenfellner, Bensheim, both of Fed. Rep. of Germany

[73] Assignee: Ciba-Geigy Corporation, Ardsley, N.Y.

Reexamination Request:
No. 90/001,312, Aug. 21, 1987

Reexamination Certificate for:
Patent No.:   3,975,354
Issued:       Aug. 17, 1976
Appl. No.:    532,124
Filed:        Dec. 12, 1974

[30]  Foreign Application Priority Data

Dec. 17, 1973 [CH]  Switzerland ............... 17661/73

[51] Int. Cl.$^4$ .............. C08K 3/22; C08L 25/04; C08L 67/02; C08G 39/02
[52] U.S. Cl. .................. 524/409; 524/492; 524/605; 525/175; 525/177; 260/DIG. 24
[58] Field of Search .............. 524/412, 409, 605; 525/177

[56]  References Cited

U.S. PATENT DOCUMENTS

3,833,685  9/1974  Wambach .............. 260/860
3,836,501  9/1974  Tacke et al. .......... 260/37

FOREIGN PATENT DOCUMENTS

996290     8/1976  Canada .
48-043038  6/1973  Japan .
1285829    8/1972  United Kingdom .

OTHER PUBLICATIONS

Roff et al.; Handbook of Common Polymers: Fibres, Films, Plastics, and Rubbers; 1971, pp. 240–252.
Encyclopedia of Polymer Science and Technology: Plastics, Resins, Rubbers, Fibers; vol. 10, pp. 756–759.
Encyclopedia of Polymer Science and Technology: Plastics, Resins, Rubbers, Fibers; vol. 11; pp. 42–45, 57–58.
C.A.; 72:32,493r (Nov. 1969).
Kirk–Othmer; Encyclopedia of Chemical Technology; 3rd Ed., vol. 18; p. 479.
Kirk–Othmer; Encyclopedia of Chemical Technology; 2nd Ed., vol. 16; pp. 106, 160, 182.
Hackh's Chemical Dictionary; 4th Ed., p. 533.

*Primary Examiner*—Lewis T. Jacobs

[57]  ABSTRACT

Glass fiber-reinforced thermoplastic polyester moulding compositions which contain poly(2,4,6-tribromostyrene) range from flame-resistant to flameproof and exhibit improved toughness properties. These moulding compositions can be used for the manufacture of shaped articles of all kinds, in accordance with the known processes.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

* * * * *